United States Patent [19]

Ikemori

[11] Patent Number: 4,509,833
[45] Date of Patent: Apr. 9, 1985

[54] HIGH VARIABLE MAGNIFICATION WIDE ANGLE ZOOM LENS

[75] Inventor: Keiji Ikemori, Kanagawa, Japan

[73] Assignee: Canon Kabushiki Kaisha, Tokyo, Japan

[21] Appl. No.: 435,560

[22] Filed: Oct. 21, 1982

[30] Foreign Application Priority Data

Oct. 28, 1981 [JP] Japan .................. 56-173538
Nov. 5, 1981 [JP] Japan .................. 56-177451

[51] Int. Cl.³ .................. G02B 9/64; G02B 15/14
[52] U.S. Cl. .................. 350/427
[58] Field of Search .................. 350/427

[56] References Cited

U.S. PATENT DOCUMENTS 4,303,311 12/1981 Nakamura .................. 350/427

Primary Examiner—John K. Corbin
Assistant Examiner—Rebecca D. Gass
Attorney, Agent, or Firm—Toren, McGeady and Stanger

[57] ABSTRACT

A wide angle zoom lens with an increased varifocal range comprises, from front to rear, a divergent 1st lens group, a convergent 2nd lens group and a divergent 3rd lens group, the aforesaid three lens groups being axially movable to effect zooming, and the focal lengths and the directions of movement of the 2nd and 3rd lens groups being properly set forth, to thereby achieve a good aberration correction.

6 Claims, 104 Drawing Figures

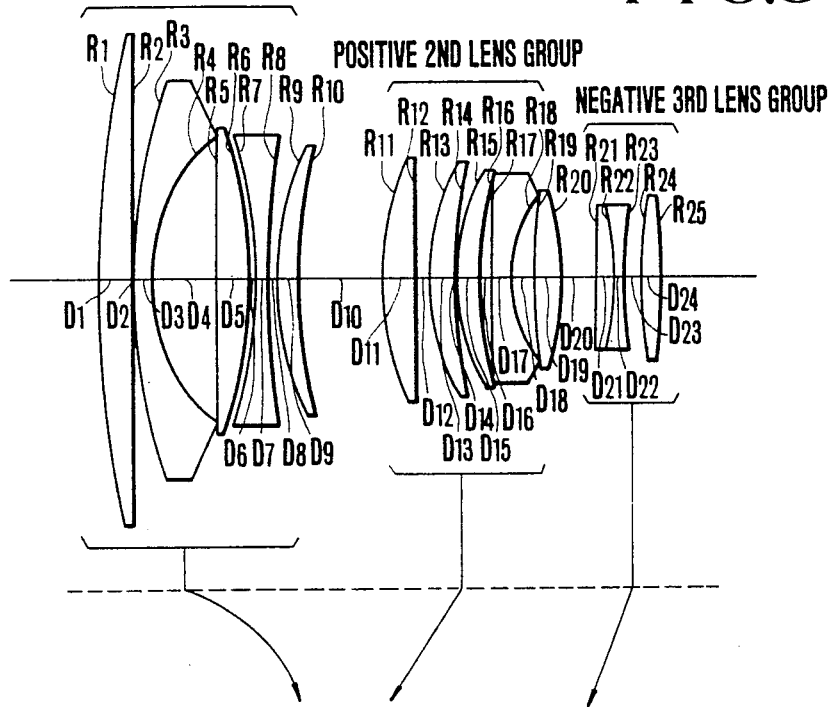
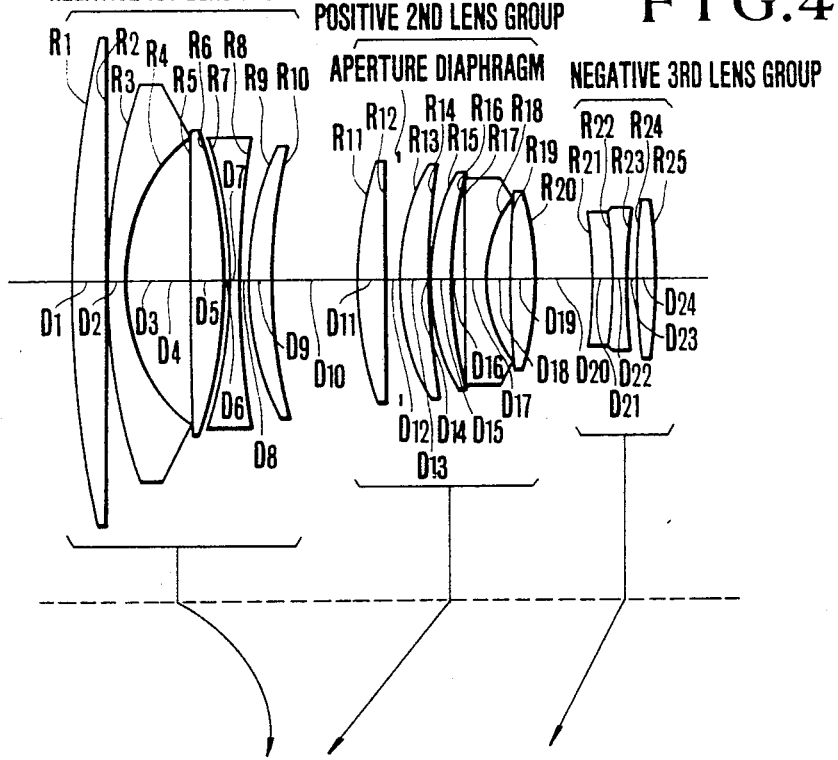

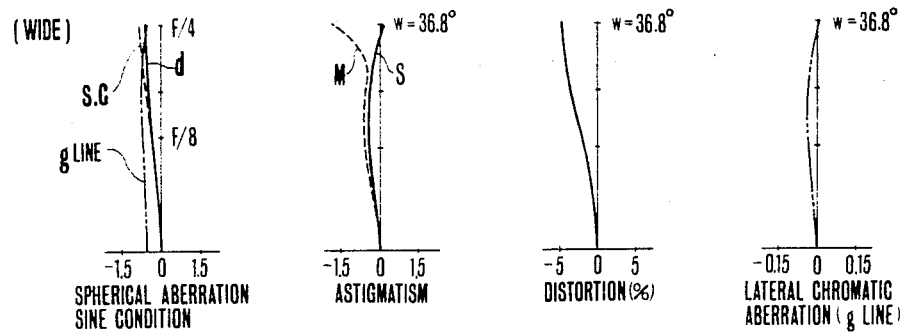
FIG.9a1 FIG.9a2 FIG.9a3 FIG.9a4
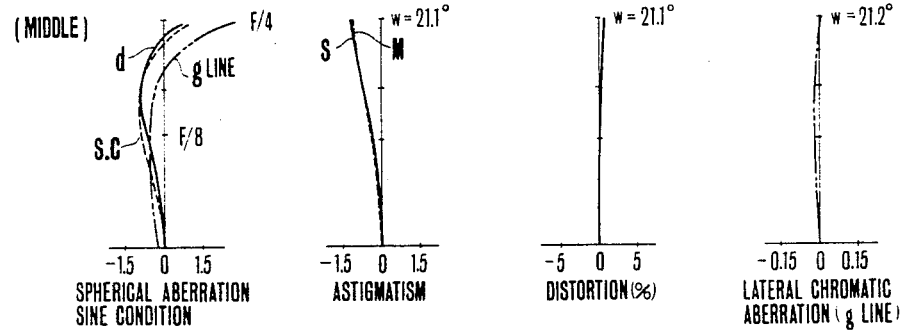
FIG.9b1 FIG.9b2 FIG.9b3 FIG.9b4
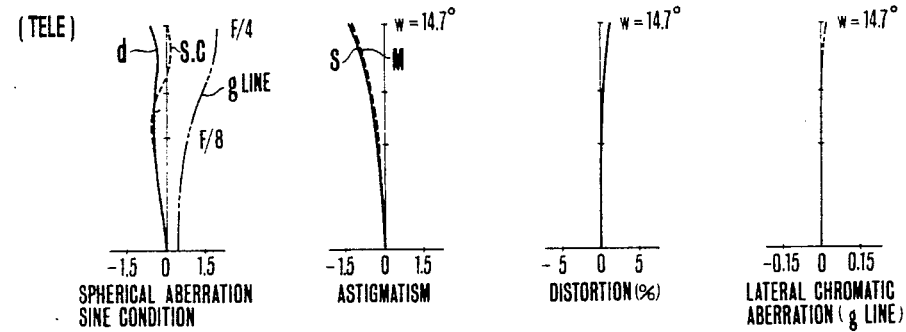
FIG.9c1 FIG.9c2 FIG.9c3 FIG.9c4

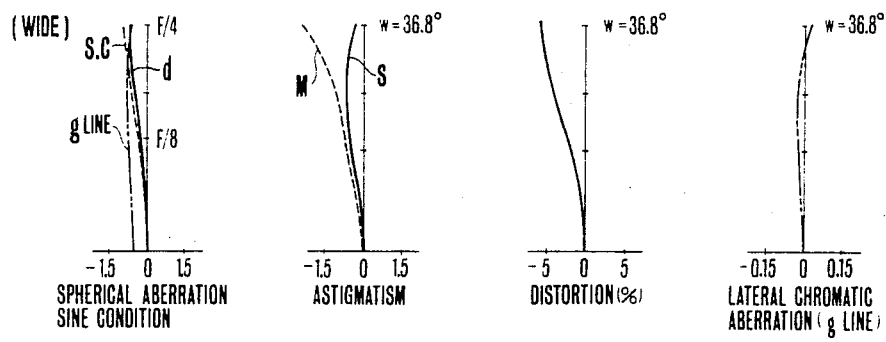
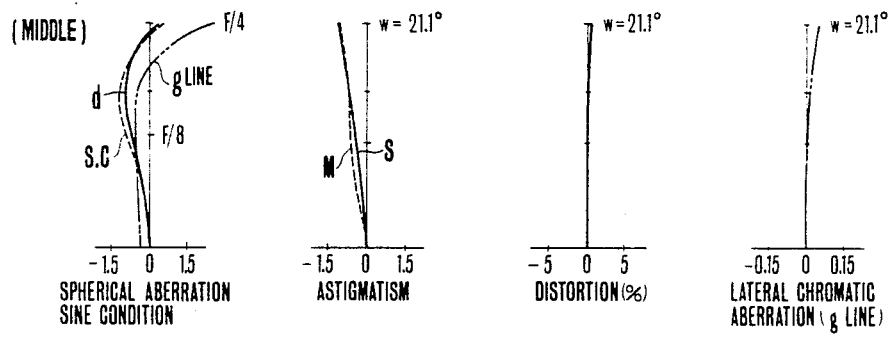
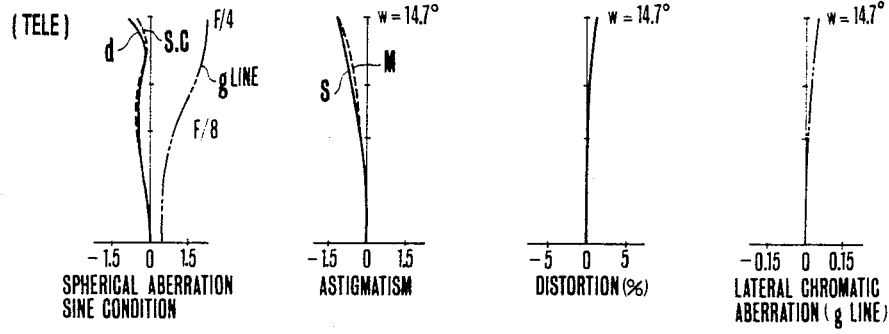

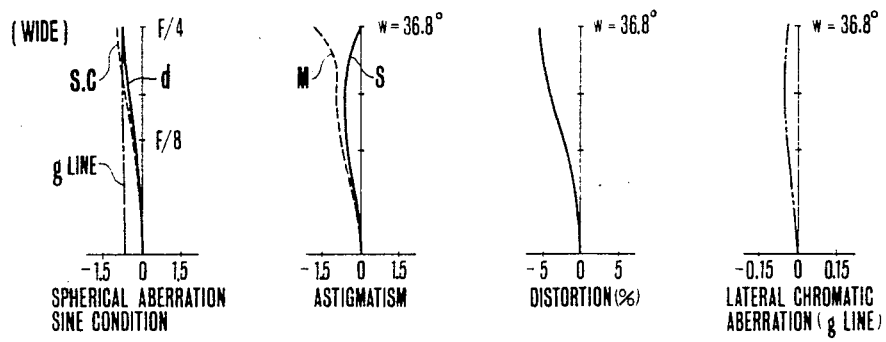
FIG.11a1 FIG.11a2 FIG.11a3 FIG.11a4
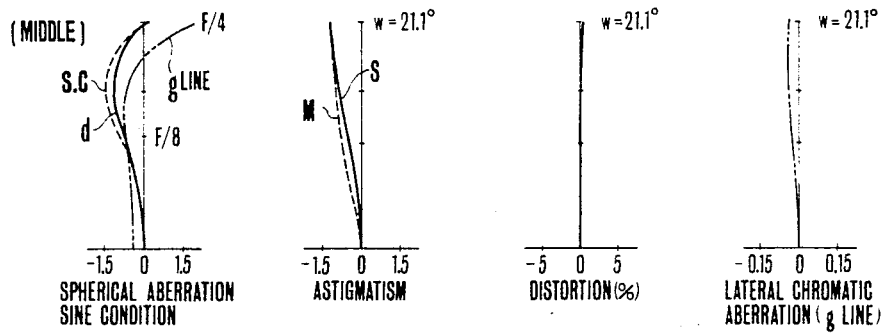
FIG.11b1 FIG.11b2 FIG.11b3 FIG.11b4
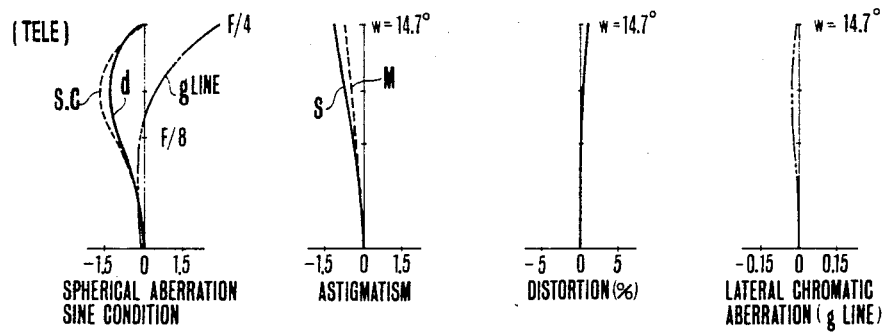
FIG.11c1 FIG.11c2 FIG.11c3 FIG.11c4

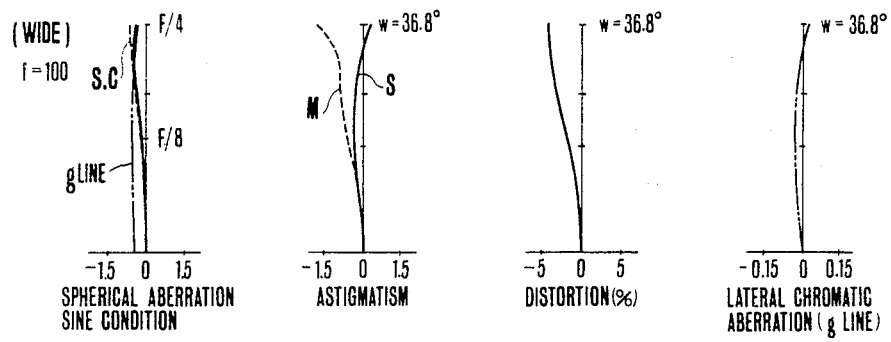
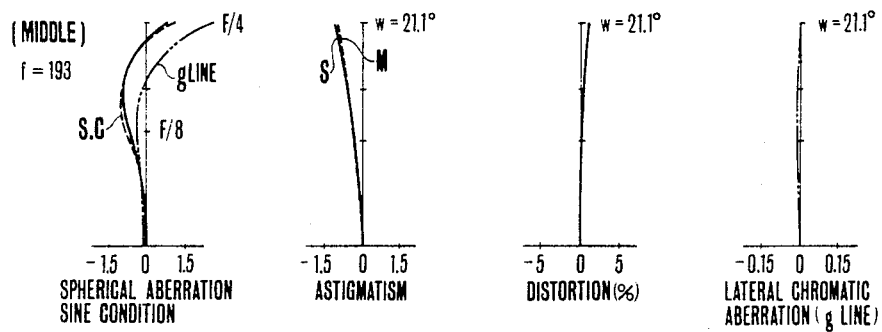
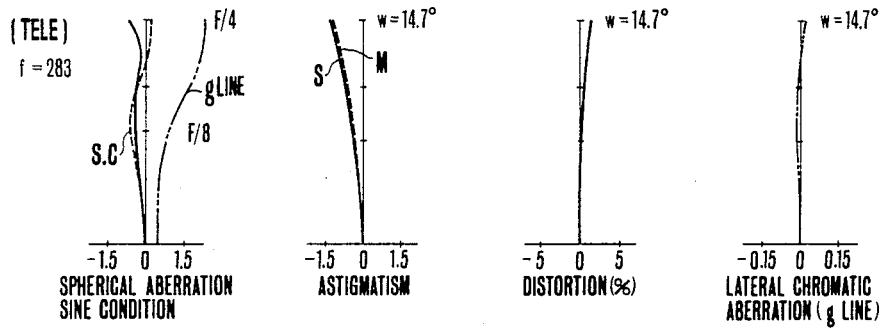

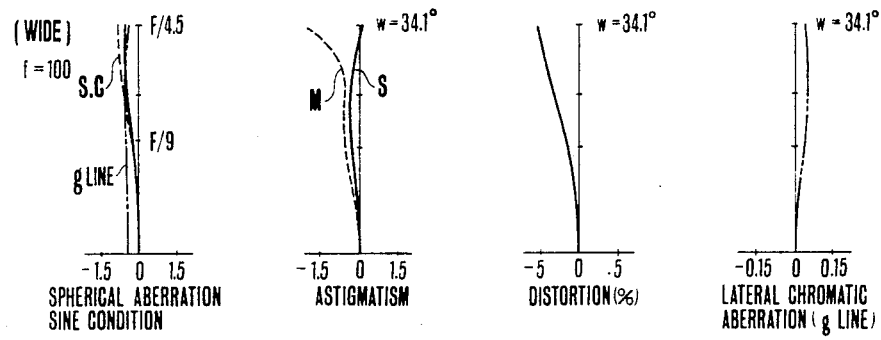
FIG.13a1 FIG.13a2 FIG.13a3 FIG.13a4
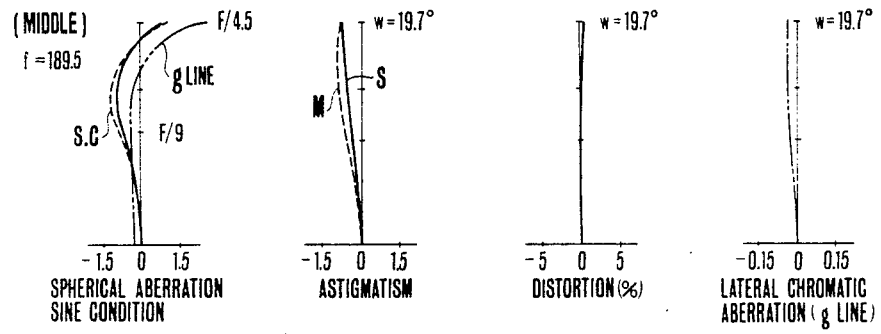
FIG.13b1 FIG.13b2 FIG.13b3 FIG.13b4
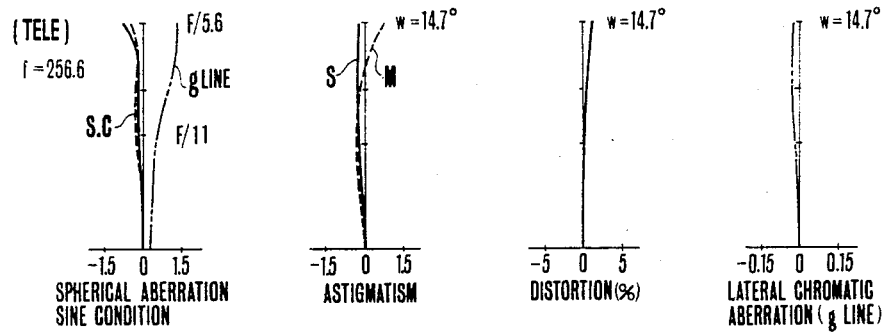
FIG.13c1 FIG.13c2 FIG.13c3 FIG.13c4

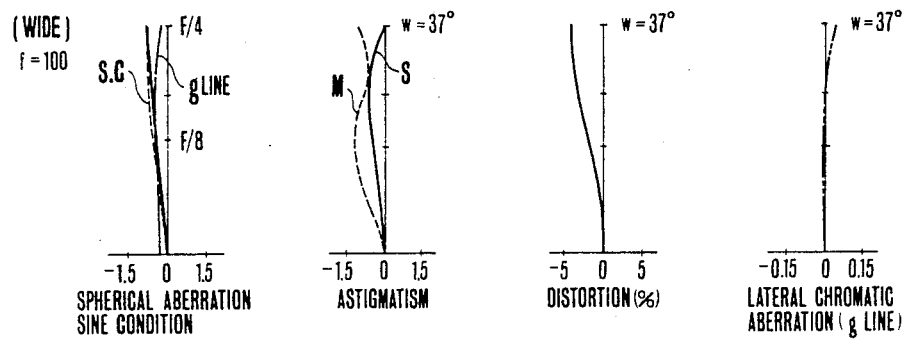
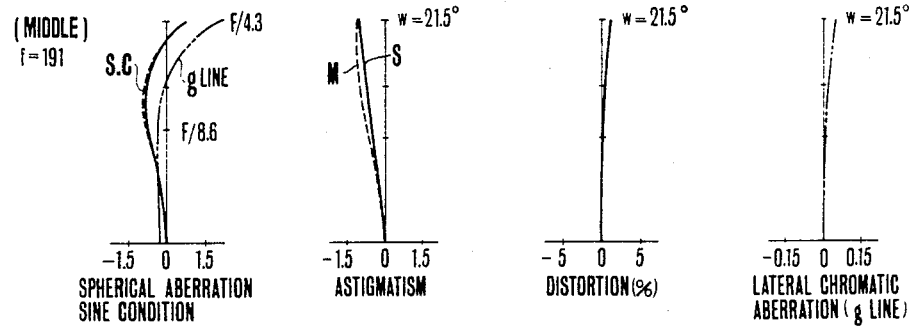
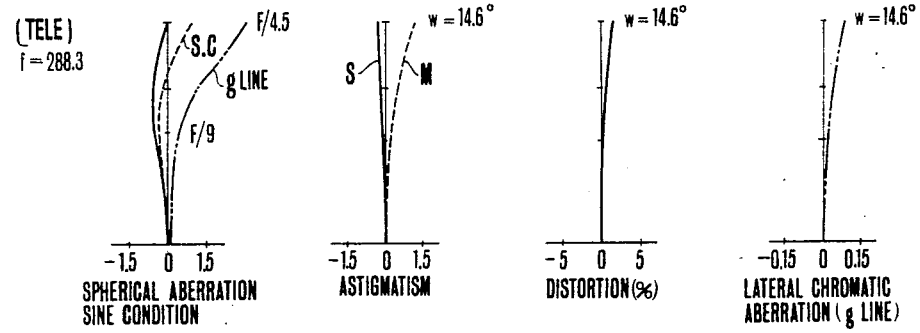

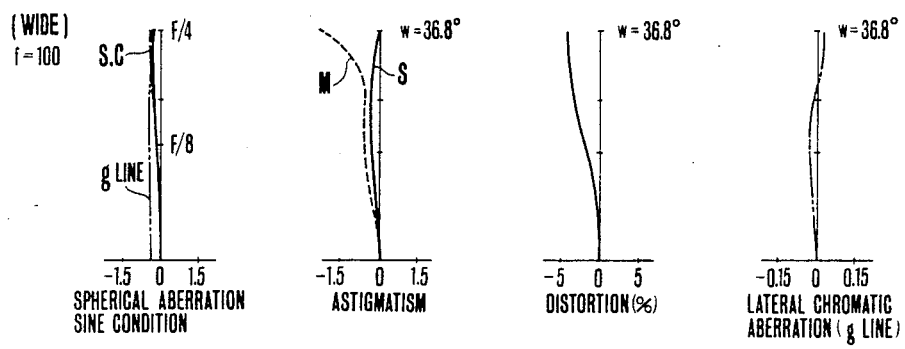
FIG.15a1  FIG.15a2  FIG.15a3  FIG.15a4
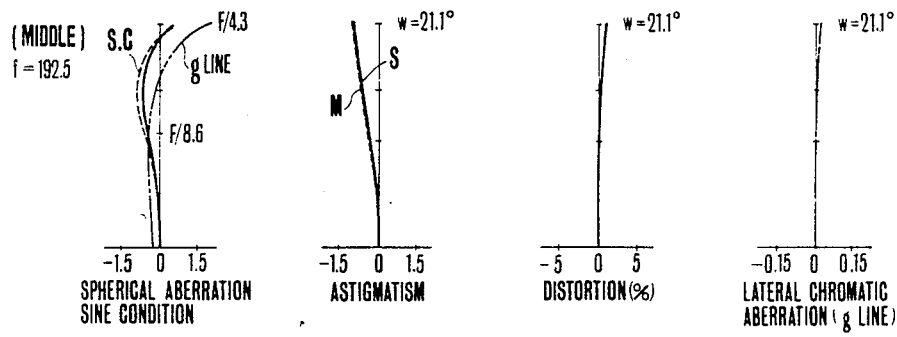
FIG.15b1  FIG.15b2  FIG.15b3  FIG.15b4
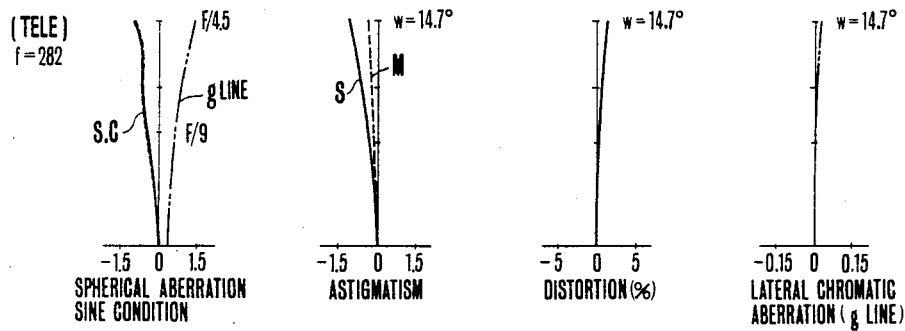
FIG.15c1  FIG.15c2  FIG.15c3  FIG.15c4

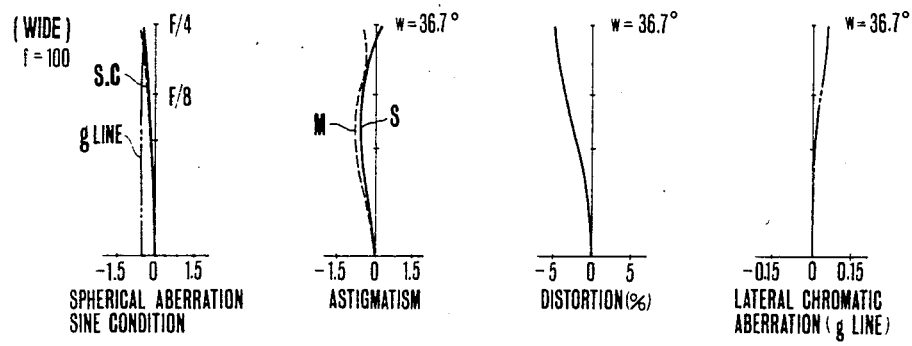
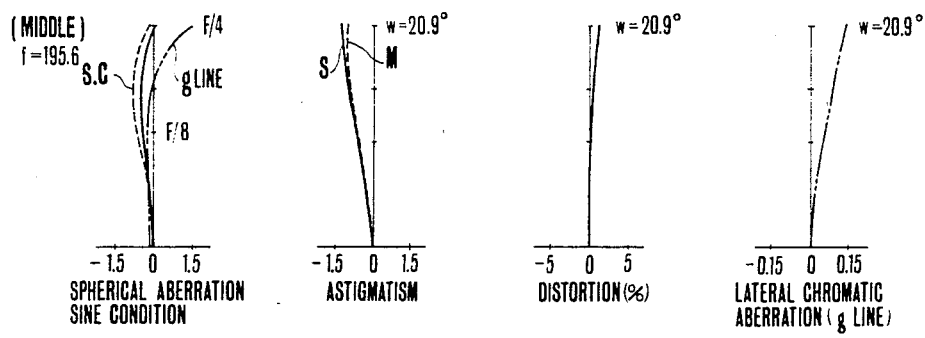
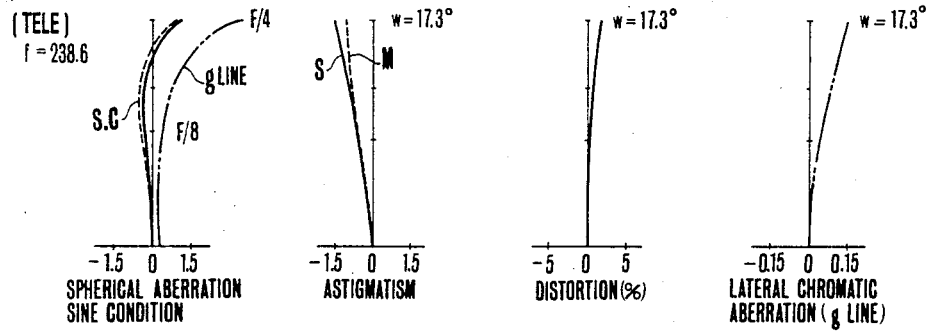

HIGH VARIABLE MAGNIFICATION WIDE ANGLE ZOOM LENS

BACKGROUND OF THE INVENTION

1. Field of the Invention

This invention relates to long range wide angle zoom lenses and more particularly to compact and high performance long range wide angle zoom lenses suited for use in TTL type 35 mm cameras.

2. Description of the Prior Art

It has already been known to provide zoom lenses of the type having a divergent 1st lens group counting from the front, a convergent 2nd lens group and a divergent 3rd lens group with the axial separations between the successive two of these three lens groups being made variable to effect zooming as proposed, for example, in B. Pat. No. 398,307, U.S. Pat. No. 4,196,969 and Japanese Laid Open Pat. No. Sho 54-26754. Of these conventional examples, however, those which have a long range of magnification change call for a large increase of the bulk and size of the lens system, and those which have little distortion with the zoom ratio on the order of about 2 cannot be said to give a high varifocal range. Also, the separation between the 2nd and 3rd lens groups is wider when in the wide angle position than when in the telephoto position. In other words, the total movement of the 3rd lens group for zooming is made larger than that of the 2nd lens group. In general, with the aforesaid power distribution over the lens groups, when it is intended to realize a greatly increased varifocal range while still preserving the bulk and size of the lens system to a minimum, the backfocal distance in the wide angle position tends to become short. Also, the maximum possible diameter of the diaphragm aperture in the telephoto position tends to increase when the diaphragm is located within the 2nd lens group.

In the zoom lens having the power distribution as in the prior art, therefore, if the manner in which the total movements of the 2nd and 3rd lens groups are differentiated remains unchanged from that described above, a problem arises wherein, as the zoom ratio increases, the back-focal distance in the wide angle position becomes shorter, and the aperture diameter in the telephoto position goes in a direction to increase.

In the interchangeable objectives for the 35 mm single lens reflex cameras, there is need of dimensioning the back-focal distance so as to allow for at least a space in which the mirror can operate. Also, since the increase in the aperture diameter calls for an increase in the outer diameter of the lens mounting, it is desirable that the aperture diameter be as reduced as possible. According to the prior art, however, it was very difficult to realize a zoom objective having an increased varifocal range with a minimization of the bulk and size of the lens system.

SUMMARY OF THE INVENTION

It is an object of the present invention to provide a zoom objective lens of increased varifocal range while still permitting a minimization of the bulk and size and correction of the various aberrations for high grade imaging performance. To accomplish the object of the invention, a zoom lens of the same configuration as in the aforesaid zoom type, or as comprising, from front to rear, a divergent 1st lens group, a convergent 2nd lens group and a divergent 3rd lens group, should have features wherein, as the aforesaid 3 lens groups are moved in a differential manner from each other to effect zooming, the differential manner for the 2nd and 3rd lens groups and their focal lengths are properly set forth so as to give greatly improved results above described.

BRIEF DESCRIPTION OF THE DRAWINGS

FIGS. 1 to 8 are block diagrams of embodiments 1 to 8 of lenses according to the present invention respectively.

FIGS. 9 to 16 are graphic representations of the various aberrations of the lenses of FIGS. 1 to 8 respectively.

DETAILED DESCRIPTION OF THE PREFERRED EMBODIMENTS

Figure 1:
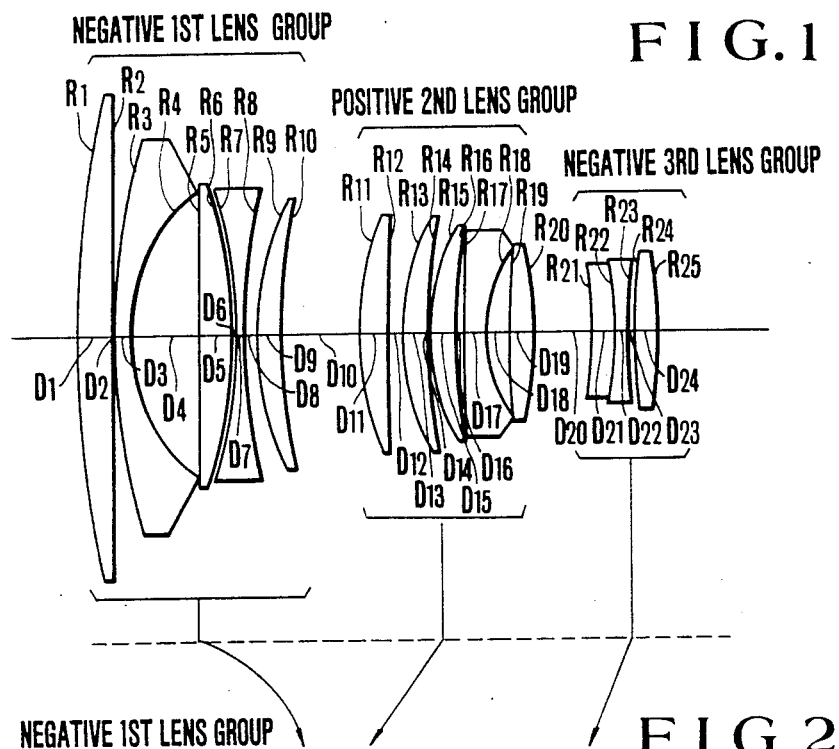
Figure 2:
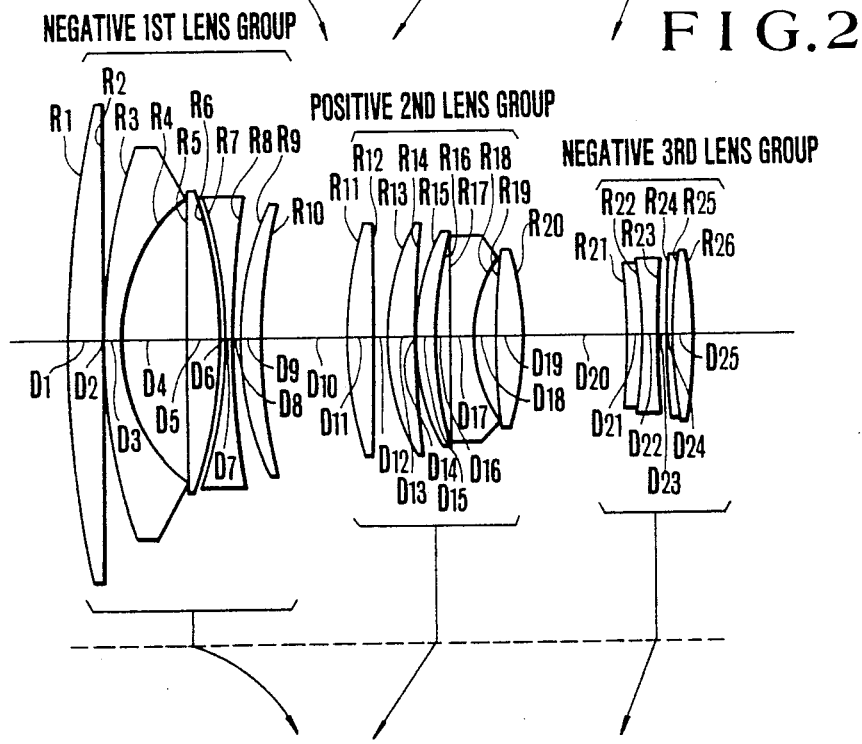
Figure 5:
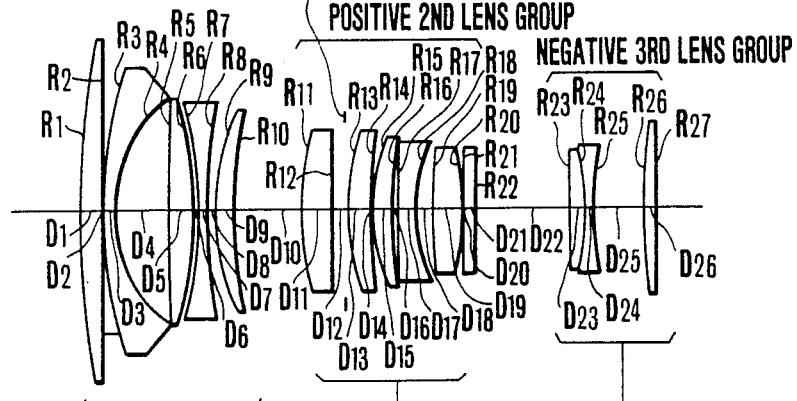
Figure 6:
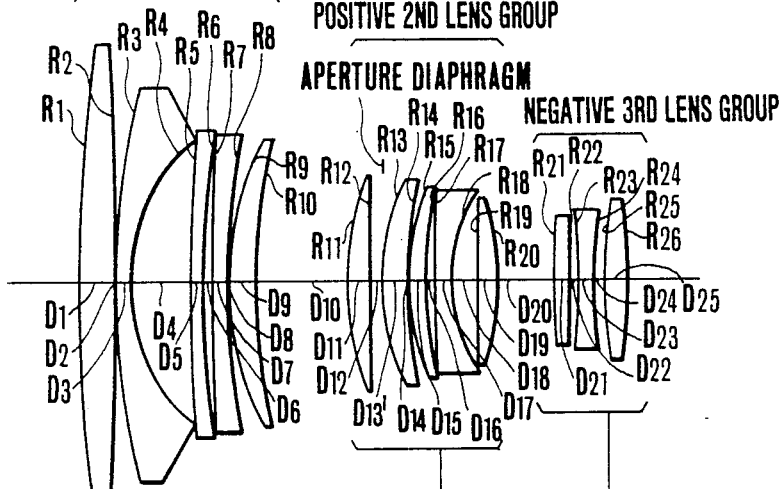
Figure 7:
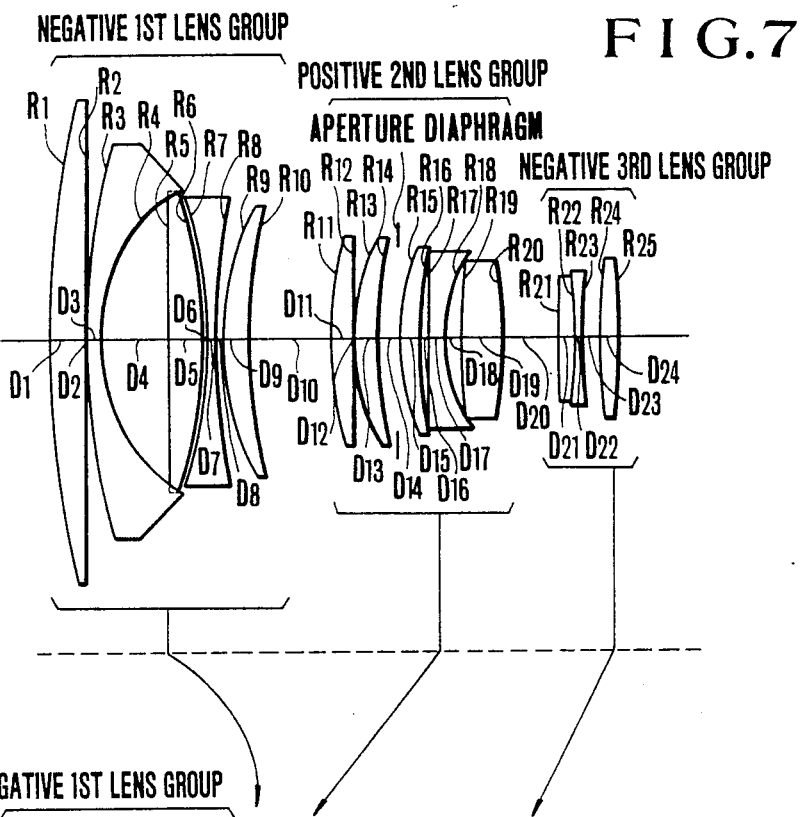
Figure 8:
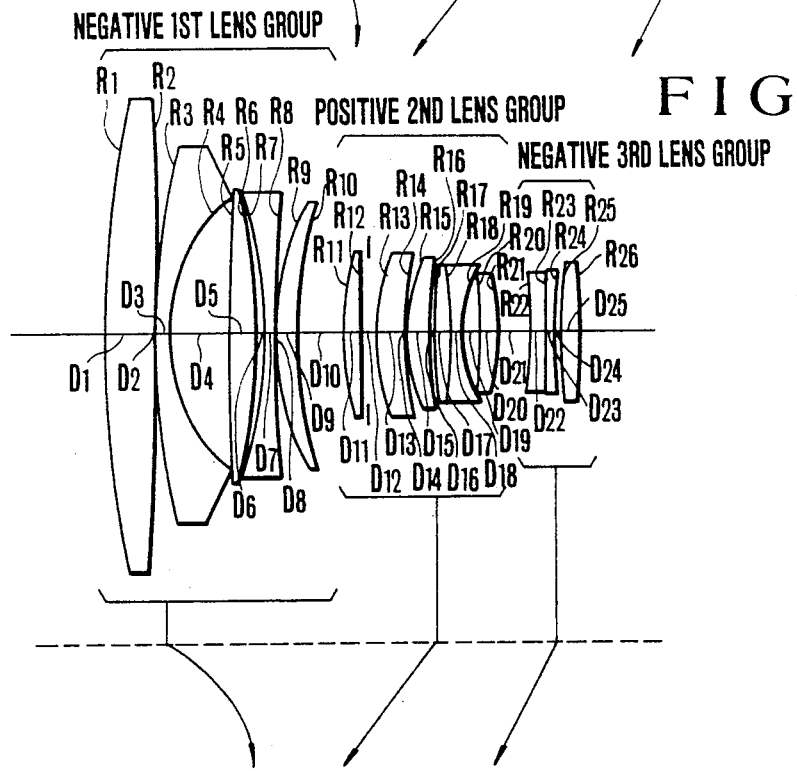

The zoom objective lens according to the present invention has, from front to rear, a divergent 1st lens group, a convergent 2nd lens group and a divergent 3rd lens group with the aforesaid 3 lens groups being moved to effect zooming and is characterized by the following conditions:

$$0.2 < t3/t2 < 0.9 \tag{1}$$

$$0.01 < f2/|f3| < 0.5 \tag{2}$$

where $t2 = b_T - b_W$ and $t3 = c_T - c_W$ wherein $b_T$ and $b_W$ are the distances from the aforesaid 2nd lens group to the image plane when in the telephoto and wide angle positions respectively, and $c_T$ and $c_W$ are the distances from the 3rd lens group to the image plane when in the telephoto and wide angle positions respectively, and f2 and f3 are the focal lengths of the 2nd and 3rd lens groups respectively.

Though the object of the present invention can be accomplished by satisfying the above-defined conditions, it is also possible to otherwise accomplish the object of the present invention by satisfying the following conditions instead of the foregoing conditions. That is, the axial separation between the 2nd and 3rd lens group is made wider when in the telephoto position than when in the wide angle position, and, letting f1, f2 and f3 denote the focal lengths of the 1st, 2nd and 3rd lens groups respectively, fT the focal length of the entire system in the telephoto position, and $l_{12W}$ and $l_{23T}$ the axial separations between the 1st and 2nd lens groups in the wide angle position and between the 2nd and 3rd lens groups in the telephoto position, $$0.4 < |f1|/fT < 0.95 \tag{3}$$

$$0.01 < f2/|f3| < 0.5 \tag{4}$$

$$0.05 < l_{23T}/l_{12W} < 0.9 \tag{5}$$

are satisfied.

In the past, the construction of a wide angle zoom objective from a divergent front assembly of lenses and a convergent rear assembly of lenses, or of a so-called two-component zoom type wide angle zoom objective was easily compatible with the high image quality and a relative reduction of the bulk and size, provided that the zoom ratio is on the order of about 2. In actual practice, therefore, there have been proposed many zoom objectives of this type. However, the employment of the two-component zoom type in realizing a longer range of magnification change than two times (for example, about 2.8 times as in the zoom objective of the present invention) leads to a rapid increase of the maximum possible diameter of the diaphragm aperture in the rear assembly of lenses which calls for an increase in the diametrical direction of the zoom lens mounting. Also the total movement of the rear assembly for zooming is rapidly increased so that the total length of the objective (the distance from the front vertex to the image plane) becomes longer in the telephoto position than in the wide angle position. Thus, from the standpoint of the constructional feature of the lens mounting, it is difficult to facilitate a minimization of the bulk and size. On this account, according to the present invention, the rear assembly of lenses in the aforesaid two-component zoom type is divided into two lens groups of which the front is of positive refractive power and the rear or 3rd lens group is of negative refractive power with the axial separation therebetween being made shortest when in the wide angle position. When zooming to the telephoto position, the 3rd is made to move slower than the 2nd lens group. For this purpose, the positive refractive power of the 2nd lens group is made stronger than the combined refractive power of the 2nd and 3rd lens groups. Also, since the total movement of the 3rd lens group is smaller than that of the 2nd lens group, it is made possible to increase the zoom ratio by a short total movement of the 2nd lens group. Also, because of the fact that it is in the telephoto position that the 3rd lens group lies farther from the 2nd lens group than in the wide angle position, and the 1st lens group is nearer to the 2nd lens group than when the objective is of the conventional two-component type having the same zoom ratio. Therefore the interval between the principal points of the 1st and 2nd lens groups in the telephoto position can be minimized. As a result, in the telephoto position, the diameter of the full open aperture of the diaphragm in the 2nd lens group can be reduced.

Condition (1) concerns with the movements of the 2nd and 3rd lens groups. When the lower limit is exceeded, a further advance in the compactness of the zoom lens can be facilitated, but variation with zooming of aberrations and particularly spherical aberration is rapidly increased so that it is very difficult to achieve a high grade imaging performance. When the upper limit of inequalities (1) is exceeded, the rule of design becomes almost the same as in the two-component zoom type, and it becomes difficult to provide a compact zoom objective.

Condition (2) defines the relationship between the refractive powers of the 2nd and 3rd lens groups.

As, in the present invention, the convergent rear component of the two-component type zoom objective is divided into the 2nd lens group of positive power and the 3rd lens group of negative power, when the negative refractive power of the 3rd lens group is strengthened it is required to strengthen the positive power of the 2nd lens group. Though this is advantageous at a minimization of the bulk and size, the astigmatism is deteriorated badly in the wide angle positions, and further variation with zooming of aberrations is increased. Also good correction of spherical aberration in the telephoto positions becomes difficult to perform. Conversely when the negative refractive power of the 3rd lens group is too weak, as the positive refractive power of the 2nd lens group becomes almost equal to that of the rear component of the two-component zoom type objective, it becomes difficult to minimize the bulk and size of the objective.

By taking into account the foregoing reason, condition (2) is given. The use of the 2nd and 3rd lens groups of which the refractive powers are in the desirable range of inequalities (2) provides assurance that a great increase in the image quality can be achieved while still permitting a minimization of the bulk and size of the complete objective to be aimed at.

In the present invention, on the other hand, the refractive power of the 1st lens group may be strengthened to some extent as compared with the conventional or two-component zoom type, for a great increase in the varifocal range and an advance in the compactness are facilitated. Condition (3) defines the limits of a range for the refractive power of the 1st lens group. When above the upper limit, the total length of the complete objective in the wide angle position is increased, and at the same time the diameter of the front lens member is also increased, thus being incompatible with the compactness. When below the lower limit, the 1st lens group when zoomed to the telephoto position produces rapidly increasing spherical aberration as over-corrected. A good compensation for this is difficult.

Condition (4) represents the power distribution over the 2nd and 3rd lens groups. As the 2nd and 3rd lens groups of the present invention are considered to result from the division of the rear component of the two-component zoom type into the positive and negative lens groups, when the upper limit of inequalities (4) is exceeded, or when the power of the negative lens group is excessively strengthened, it is required that the power of the positive lens group be rapidly strengthened too. Though this is advantageous to the advance in the compactness, the astigmatism in the wide angle position is rapidly under-corrected, and further aberration correction throughout the zooming range becomes unstable. Also good correction of spherical aberration in the telephoto positions becomes difficult. Conversely when the lower limit is exceeded, as the refractive power of the negative lens group is too weak, the power of the positive lens group is also weakened and, therefore, the varifocal function as the sum of axial movements of the three groups is weakened, thus contradicting to the advance in the compactness.

Condition (5) is to make the compactness and the high grade imaging performance compatible with each other also. When above the upper limit, though this is advantageous to the advance in the compactness, variation of aberrations with zooming is increased, thus making it impossible to preserve the high grade imagery. When below the lower limit, the total axial movements of the three lens groups have to be elongated, thus contradicting to the advance in the compactness.

To achieve a further improvement of the image quality, the zoom objective of the present invention is provided with at least one positive lens at the rear of the 3rd lens group. Since the 3rd lens group lies on the image side of the diaphragm during zooming, outward coma is apt to be produced. As the compactness advances, this phenomenon becomes prominent.

Therefore, to maintain good stability of aberration correction throughout the extended zooming range as in the present invention, the use of at least one positive lens member at the rearmost position of the 3rd lens group is made to remove coma as this lens member contributes an inward coma to the entire system.

Further, a positive lens is arranged at the frontmost position of the 1st lens group to correct distortion in the wide angle positions, and another positive lens at the rearmost position thereof so that an air lens of converging action is created together with a forwardly juxtapositioned lens to extremely well remove the over-corrected spherical abberation resulting from the negative lens in this lens group in the telephoto positions. Also within the 1st lens group, there is provided a diverging meniscus-shaped air lens concave toward the front with an advantage of well correcting astigmatism in the wide angle positions. This air lens may be omitted when so much desired an increase in the image quality is not required.

Next, because the refractive power of the 2nd lens group is somewhat strong and for rapid under-correction of spherical aberration is avoided, the 2nd lens group is preferably provided with at least three positive lenses, and it is preferred that among them there is at least one negative lens member. And, as it is desired to position the front principal point of the 2nd lens group somewhat ahead to the front, it is better that the number of positive lenses on the object side of the negative lens is larger than that of positive lenses on the image side thereof. Also, it is preferred to position the diaphragm within the 2nd lens group from the standpoint of correcting aberrations in good balance and of simplifying the complexity of the lens mounting mechanism. But it may not necessarily in the 2nd lens group.

The principles of the present invention described above enable the realization of a wide angle zoom objective having a zoom ratio of 2.83 with an angular field of view ranging from 73.5° to 29.5° and an F-number of 1:4 reducing the bulk and size to a minimum while still maintaining good stability of aberration correction throughout the extended zooming range as will be seen from the following specific examples of the zoom objective.

Next, the numerical data in accordance with which the embodiments of the present invention can be constructed are given for the radii of curvature, R, the axial separations and thicknesses, D, and the refractive indices, N, and Abbe numbers, $v$, of the glasses from which the various lens elements are made with the subscripts numbered consecutively from front to rear.

EXAMPLE 1

| F = 100-283 | FNo = 1:4 | 2ω = 73.6-29.4 | |
|---|---|---|---|
| R1 = 479.18 | D1 = 15.36 | N1 = 1.60311 | $v1$ = 60.7 |
| R2 = −21237.43 | D2 = 0.52 | | |
| R3 = 252.81 | D3 = 6.64 | N2 = 1.80400 | $v2$ = 46.6 |
| R4 = 74.75 | D4 = 30.46 | | |
| R5 = 1101.35 | D5 = 16.04 | N3 = 1.63636 | $v3$ = 35.4 |
| R6 = −207.87 | D6 = 2.70 | | |
| R7 = −186.83 | D7 = 4.85 | N4 = 1.81600 | $v4$ = 46.6 |
| R8 = 321.36 | D8 = 4.17 | | |
| R9 = 123.97 | D9 = 10.54 | N5 = 1.80518 | $v5$ = 25.4 |
| R10 = 231.17 | D10 = Variable | | |
| R11 = 142.08 | D11 = 11.83 | N6 = 1.77250 | $v6$ = 49.6 |
| R12 = 1212.17 | D12 = 7.64 | | |
| R13 = 95.57 | D13 = 13.59 | N7 = 1.71300 | $v7$ = 53.8 |
| R14 = 282.55 | D14 = 0.45 | | |
| R15 = 87.69 | D15 = 11.11 | N8 = 1.60311 | $v8$ = 60.7 |
| R16 = 183.77 | D16 = 4.98 | | |
| R17 = 3926.24 | D17 = 9.99 | N9 = 1.84666 | $v9$ = 23.9 |
| R18 = 59.48 | D18 = 9.96 | | |
| R19 = 272.38 | D19 = 11.18 | N10 = 1.74950 | $v10$ = 35.3 |
| R20 = −158.35 | D20 = Variable | | |
| R21 = −323.00 | D21 = 10.20 | N11 = 1.60342 | $v11$ = 38.0 |
| R22 = −180.60 | D22 = 6.23 | N12 = 1.79952 | $v12$ = 42.2 |
| R23 = 230.61 | D23 = 3.52 | | |
| R24 = 269.25 | D24 = 8.94 | N13 = 1.63980 | $v13$ = 34.5 |

| -continued | | | |
|---|---|---|---|
| F = 100-283 | FNo = 1:4 | 2ω = 73.6-29.4 | |
| R25 = −277.18 | | | |
| f | 100 | 193 | 283 |
| D10 | 145.27 | 38.93 | 2.23 |
| D20 | 4.04 | 26.25 | 46.91 |

$$\frac{t_3}{t_2} = 0.66$$

$$\frac{f_2}{|f_3|} = 0.182$$

EXAMPLE 2

| F = 100-283 | FNo = 1:4 | 2ω = 73.6-29.4 | |
|---|---|---|---|
| R1 = 478.12 | D1 = 14.77 | N1 = 1.60311 | $v1$ = 60.7 |
| R2 = 10315.69 | D2 = 0.52 | | |
| R3 = 253.12 | D3 = 6.66 | N2 = 1.80400 | $v2$ = 46.6 |
| R4 = 75.54 | D4 = 30.67 | | |
| R5 = 1101.72 | D5 = 15.35 | N3 = 1.63636 | $v3$ = 35.4 |
| R6 = −208.37 | D6 = 2.41 | | |
| R7 = −185.42 | D7 = 4.86 | N4 = 1.81600 | $v4$ = 46.6 |
| R8 = 318.84 | D8 = 3.26 | | |
| R9 = 125.38 | D9 = 10.71 | N5 = 1.80518 | $v5$ = 25.4 |
| R10 = 241.65 | D10 = Variable | | |
| R11 = 147.97 | D11 = 12.56 | N6 = 1.77250 | $v6$ = 49.6 |
| R12 = 1194.62 | D12 = 7.93 | | |
| R13 = 98.74 | D13 = 12.81 | N7 = 1.71300 | $v7$ = 53.8 |
| R14 = 289.85 | D14 = 0.46 | | |
| R15 = 87.54 | D15 = 11.65 | N8 = 1.60311 | $v8$ = 60.7 |
| R16 = 177.16 | D16 = 5.13 | | |
| R17 = 4281.04 | D17 = 11.63 | N9 = 1.84666 | $v9$ = 23.9 |
| R18 = 61.80 | D18 = 9.95 | | |
| R19 = 309.96 | D19 = 11.02 | N10 = 1.74950 | $v10$ = 35.3 |
| R20 = −159.49 | D20 = Variable | | |
| R21 = −505.79 | D21 = 7.02 | N11 = 1.59551 | $v11$ = 39.2 |
| R22 = −205.20 | D22 = 6.90 | N12 = 1.79952 | $v12$ = 42.2 |
| R23 = 298.69 | D23 = 4.39 | | |
| R24 = 347.59 | D24 = 2.76 | N13 = 1.62588 | $v13$ = 35.7 |
| R25 = 172.44 | D25 = 8.36 | N14 = 1.63980 | $v14$ = 34.5 |
| R26 = −376.97 | | | |

| f | 100 | 193.5 | 283 |
|---|---|---|---|
| D10 | 148.22 | 39.14 | 2.06 |
| D20 | 6.54 | 47.79 | 86.35 |

$$\frac{t_3}{t_2} = 0.35$$

$$\frac{f_2}{|f_3|} = 0.1389$$

EXAMPLE 3

| F = 100-284 | FNo = 1:4 | 2ω = 73.6-29.4 | |
|---|---|---|---|
| R1 = 495.87 | D1 = 15.20 | N1 = 1.60311 | $v1$ = 60.7 |
| R2 = −38187.12 | D2 = 0.52 | | |
| R3 = 249.74 | D3 = 6.65 | N2 = 1.80400 | $v2$ = 46.6 |
| R4 = 75.16 | D4 = 30.53 | | |
| R5 = 967.89 | D5 = 15.67 | N3 = 1.63636 | $v3$ = 35.4 |
| R6 = −208.45 | D6 = 3.47 | | |
| R7 = −186.58 | D7 = 4.86 | N4 = 1.81600 | $v4$ = 46.6 |
| R8 = 316.15 | D8 = 4.14 | | |
| R9 = 124.36 | D9 = 10.02 | N5 = 1.80518 | $v5$ = 25.4 |
| R10 = 230.15 | D10 = Variable | | |
| R11 = 138.09 | D11 = 13.10 | N6 = 1.77250 | $v6$ = 49.6 |
| R12 = 1176.37 | D12 = 7.43 | | |
| R13 = 92.80 | D13 = 12.45 | N7 = 1.71300 | $v7$ = 53.8 |
| R14 = 274.72 | D14 = 0.43 | | |
| R15 = 85.39 | D15 = 11.13 | N8 = 1.60311 | $v8$ = 60.7 |

-continued

| F = 100–284 FNo 1:4 2ω = 73.6–29.4 | | | |
|---|---|---|---|
| R16 = 177.61 | D16 = 4.86 | | |
| R17 = 2691.12 | D17 = 8.77 | N9 = 1.84666 | ν9 = 23.9 |
| R18 = 58.45 | D18 = 10.33 | | |
| R19 = 275.05 | D19 = 11.35 | N10 = 1.74950 | ν10 = 35.3 |
| R20 = −153.55 | D20 = Variable | | |
| R21 = −513.47 | D21 = 6.56 | N11 = 1.60342 | ν11 = 38.0 |
| R22 = −129.83 | D22 = 5.09 | N12 = 1.79952 | ν12 = 42.2 |
| R23 = 199.90 | D23 = 7.75 | | |
| R24 = 219.88 | D24 = 8.81 | N13 = 1.63980 | ν13 = 34.5 |
| R25 = −401.32 | | | |

| f | 100 | 193 | 283.5 |
|---|---|---|---|
| D10 | 144.2 | 39.04 | 2.53 |
| D20 | 5.09 | 18.61 | 31.3 |

$$\frac{t_3}{t_2} = 0.8$$

$$\frac{f_2}{|f_3|} = 0.217$$

EXAMPLE 4

| F = 100–283 FNo 1:4 2ω = 73.6–29.4 | | | |
|---|---|---|---|
| R1 = 480.45 | D1 = 15.54 | N1 = 1.60311 | ν1 = 60.7 |
| R2 = −21581.57 | D2 = 0.52 | | |
| R3 = 253.22 | D3 = 6.66 | N2 = 1.80400 | ν2 = 46.6 |
| R4 = 74.93 | D4 = 30.55 | | |
| R5 = 1103.65 | D5 = 16.09 | N3 = 1.63636 | ν3 = 35.4 |
| R6 = −208.16 | D6 = 2.71 | | |
| R7 = −187.17 | D7 = 4.86 | N4 = 1.81600 | ν4 = 46.6 |
| R8 = 321.93 | D8 = 4.22 | | |
| R9 = 124.26 | D9 = 10.65 | N5 = 1.80518 | ν5 = 25.4 |
| R10 = 231.35 | D10 = Variable | | |
| R11 = 142.52 | D11 = 11.91 | N6 = 1.77250 | ν6 = 49.6 |
| R12 = 1221.67 | D12 = 7.66 | | |
| R13 = 95.82 | D13 = 13.61 | N7 = 1.71300 | ν7 = 53.8 |
| R14 = 283.63 | D14 = 0.45 | | |
| R15 = 87.86 | D15 = 11.14 | N8 = 1.60311 | ν8 = 60.7 |
| R16 = 184.29 | D16 = 5.00 | | |
| R17 = 4053.40 | D17 = 10.03 | N9 = 1.84666 | ν9 = 23.9 |
| R18 = 59.61 | D18 = 10.00 | | |
| R19 = 272.84 | D19 = 11.23 | N10 = 1.74950 | ν10 = 35.3 |
| R20 = −158.61 | D20 = Variable | | |
| R21 = −352.02 | D21 = 10.31 | N11 = 1.60342 | ν11 = 38.0 |
| R22 = −178.75 | D22 = 6.24 | N12 = 1.79952 | ν12 = 42.2 |
| R23 = 230.96 | D23 = 4.28 | | |
| R24 = 269.81 | D24 = 8.64 | N13 = 1.63980 | ν13 = 34.5 |
| R25 = −295.40 | | | |

| f | 100 | 193 | 283 |
|---|---|---|---|
| D10 | 145.36 | 38.63 | 2.1 |
| D20 | 4.27 | 26.62 | 47.26 |

$$\frac{|f_1|}{f_T} = 0.564 \quad \frac{l_{2T}}{l_{1W}} = 0.325$$

$$\frac{f_2}{|f_3|} = 0.182$$

EXAMPLE 5

| F = 100–256.6 FNo 1:4.5–5.6 2ω = 68.2–29.5 | | | |
|---|---|---|---|
| R1 = 410.83 | D1 = 10.38 | N1 = 1.60311 | ν1 = 60.7 |
| R2 = 428129.31 | D2 = 0.41 | | |
| R3 = 197.61 | D3 = 5.28 | N2 = 1.80400 | ν2 = 46.6 |
| R4 = 61.25 | D4 = 22.91 | | |
| R5 = 703.84 | D5 = 12.29 | N3 = 1.63636 | ν3 = 35.4 |
| R6 = −165.60 | D6 = 2.12 | | |
| R7 = −147.03 | D7 = 3.86 | N4 = 1.81600 | ν4 = 46.6 |

-continued

| F = 100–256.6 FNo 1:4.5–5.6 2ω = 68.2–29.5 | | | |
|---|---|---|---|
| R8 = 243.74 | D8 = 3.95 | | |
| R9 = 99.78 | D9 = 7.67 | N5 = 1.84666 | ν5 = 23.9 |
| R10 = 172.28 | D10 = Variable | | |
| R11 = 125.90 | D11 = 14.67 | N6 = 1.77250 | ν6 = 49.6 |
| R12 = 1004.63 | D12 = 6.74 | | |
| R13 = 83.73 | D13 = 11.39 | N7 = 1.71300 | ν7 = 53.8 |
| R14 = 246.96 | D14 = 0.39 | | |
| R15 = 75.42 | D15 = 9.21 | N8 = 1.60311 | ν8 = 60.7 |
| R16 = 159.97 | D16 = 3.35 | | |
| R17 = 1359.46 | D17 = 7.67 | N9 = 1.84666 | ν9 = 23.9 |
| R18 = 53.51 | D18 = 7.87 | | |
| R19 = 229.88 | D19 = 14.77 | N10 = 1.74950 | ν10 = 35.3 |
| R20 = −158.70 | D20 = 0.47 | | |
| R21 = 3127.80 | D21 = 6.26 | N11 = 1.60342 | ν11 = 38.0 |
| R22 = ∞ | D22 = Variable | | |
| R23 = 513.73 | D23 = 5.96 | N12 = 1.59270 | ν12 = 35.3 |
| R24 = −136.52 | D24 = 4.61 | N13 = 1.78590 | ν13 = 44.2 |
| R25 = 167.57 | D25 = 21.82 | | |
| R26 = 232.93 | D26 = 6.02 | N14 = 1.63980 | ν14 = 34.5 |
| R27 = 3087.68 | | | |

| f | 100 | 189.5 | 256.6 |
|---|---|---|---|
| D10 | 113.34 | 33.01 | 9.48 |
| D22 | 3.02 | 44.18 | 73.96 |

$$\frac{|f_1|}{f_T} = 0.494 \quad \frac{l_{2T}}{l_{1W}} = 0.653$$

$$\frac{f_2}{|f_3|} = 0.218$$

EXAMPLE 6

| F = 100–288.3 FNo 1:4–4.5 2ω = 74–29.3 | | | |
|---|---|---|---|
| R1 = 598.17 | D1 = 16.52 | N1 = 1.60311 | ν1 = 60.7 |
| R2 = −2590.27 | D2 = 0.52 | | |
| R3 = 348.33 | D3 = 5.23 | N2 = 1.77250 | ν2 = 46.6 |
| R4 = 75.24 | D4 = 28.92 | | |
| R5 = 929.78 | D5 = 5.23 | N3 = 1.77250 | ν3 = 49.6 |
| R6 = 341.16 | D6 = 5.04 | | |
| R7 = 1107.87 | D7 = 6.97 | N4 = 1.69680 | ν4 = 55.5 |
| R8 = 353.53 | D8 = 0.57 | | |
| R9 = 115.71 | D9 = 11.65 | N5 = 1.80518 | ν5 = 25.4 |
| R10 = 219.07 | D10 = Variable | | |
| R11 = 124.97 | D11 = 10.29 | N6 = 1.77250 | ν6 = 49.6 |
| R12 = 22136.43 | D12 = 6.50 | | |
| R13 = 102.09 | D13 = 11.31 | N7 = 1.72000 | ν7 = 50.2 |
| R14 = 188.68 | D14 = 0.49 | | |
| R15 = 89.48 | D15 = 9.23 | N8 = 1.72000 | ν8 = 50.2 |
| R16 = 175.47 | D16 = 4.97 | | |
| R17 = −873.45 | D17 = 6.51 | N9 = 1.84666 | ν9 = 23.9 |
| R18 = 66.25 | D18 = 11.50 | | |
| R19 = 439.70 | D19 = 9.95 | N10 = 1.63636 | ν10 = 35.4 |
| R20 = 115.73 | D20 = Variable | | |
| R21 = 957.54 | D21 = 6.97 | N11 = 1.59551 | ν11 = 39.2 |
| R22 = −3800.13 | D22 = 3.48 | | |
| R23 = −360.19 | D23 = 6.97 | N12 = 1.83481 | ν12 = 42.7 |
| R24 = 144.43 | D24 = 5.23 | | |
| R25 = 210.86 | D25 = 10.45 | N13 = 1.66755 | ν13 = 41.9 |
| R26 = −265.55 | | | |

| f | 100 | 191.4 | 288.3 |
|---|---|---|---|
| D10 | 161.05 | 44.81 | 1.88 |
| D20 | 3.47 | 25.91 | 48.84 |

$$\frac{|f_1|}{f_T} = 0.586 \quad \frac{l_{2T}}{l_{1W}} = 0.303$$

$$\frac{f_2}{|f_3|} = 0.164$$

EXAMPLE 7

| F = 100–282 FNo = 1:4–4.5 2ω = 73.6–29.5 | | | |
|---|---|---|---|
| R1 = 450.19 | D1 = 15.60 | N1 = 1.60311 | ν1 = 60.7 |
| R2 = ∞ | D2 = 0.41 | | |
| R3 = 254.91 | D3 = 6.60 | N2 = 1.80400 | ν2 = 46.6 |
| R4 = 74.26 | D4 = 30.85 | | |
| R5 = 1204.96 | D5 = 15.60 | N3 = 1.63636 | ν3 = 35.4 |
| R6 = −212.06 | D6 = 2.68 | | |
| R7 = −191.28 | D7 = 4.81 | N4 = 1.80400 | ν4 = 46.6 |
| R8 = 309.12 | D8 = 3.85 | | |
| R9 = 119.84 | D9 = 10.34 | N5 = 1.80518 | ν5 = 25.4 |
| R10 = 214.93 | D10 = Variable | | |
| R11 = 152.88 | D11 = 10.17 | N6 = 1.71300 | ν6 = 53.8 |
| R12 = −3599.03 | D12 = 0.45 | | |
| R13 = 88.56 | D13 = 10.24 | N7 = 1.77250 | ν7 = 49.6 |
| R14 = 173.85 | D14 = 10.82 | | |
| R15 = 88.57 | D15 = 9.17 | N8 = 1.69680 | ν8 = 55.5 |
| R16 = 187.04 | D16 = 3.40 | | |
| R17 = 1411.42 | D17 = 7.73 | N9 = 1.84666 | ν9 = 23.9 |
| R18 = 58.88 | D18 = 7.49 | | |
| R19 = 223.89 | D19 = 19.65 | N10 = 1.74950 | ν10 = 35.3 |
| R20 = −171.18 | D20 = Variable | | |
| R21 = −886.80 | D21 = 6.01 | N11 = 1.56732 | ν11 = 42.8 |
| R22 = −263.09 | D22 = 3.68 | N12 = 1.79952 | ν12 = 42.2 |
| R23 = 197.27 | D23 = 9.28 | | |
| R24 = 258.37 | D24 = 7.87 | N13 = 1.64769 | ν13 = 33.8 |
| R25 = −533.85 | | | |

| f | 100 | 192.5 | 282 |
|---|---|---|---|
| D10 | 142.62 | 38.58 | 2.69 |
| D20 | 4.08 | 26.27 | 46.83 |

$$\frac{|f_1|}{f_T} = 0.556 \quad \frac{l_{2T}}{l_{1W}} = 0.328$$

$$\frac{f_2}{|f_3|} = 0.189$$

EXAMPLE 8

| F = 100–238.6 FNo = 1:4 2ω = 73.5–34.7 | | | |
|---|---|---|---|
| R1 = 676.24 | D1 = 23.38 | N1 = 1.60311 | ν1 = 60.7 |
| R2 = −3248.28 | D2 = 0.45 | | |
| R3 = 357.98 | D3 = 6.90 | N2 = 1.80400 | ν2 = 46.6 |
| R4 = 83.46 | D4 = 30.61 | | |
| R5 = 998.39 | D5 = 15.33 | N3 = 1.63636 | ν3 = 35.4 |
| R6 = −257.53 | D6 = 2.94 | | |
| R7 = −223.50 | D7 = 5.88 | N4 = 1.81600 | ν4 = 46.6 |
| R8 = 760.69 | D8 = 0.49 | | |
| R9 = 125.71 | D9 = 10.64 | N5 = 1.80518 | ν5 = 25.4 |
| R10 = 200.06 | D10 = Variable | | |
| R11 = 141.80 | D11 = 7.70 | N6 = 1.77250 | ν6 = 49.6 |
| R12 = 1040.33 | D12 = 7.66 | | |
| R13 = 96.55 | D13 = 15.58 | N7 = 1.71300 | ν7 = 53.8 |
| R14 = 281.88 | D14 = 0.45 | | |
| R15 = 88.85 | D15 = 11.00 | N8 = 1.66672 | ν8 = 48.3 |
| R16 = 180.27 | D16 = 4.03 | | |
| R17 = 2233.13 | D17 = 6.55 | N9 = 1.75520 | ν9 = 27.5 |
| R18 = −348.46 | D18 = 6.18 | N10 = 1.84666 | ν10 = 23.9 |
| R19 = 58.73 | D19 = 7.92 | | |
| R20 = 361.20 | D20 = 10.41 | N11 = 1.74950 | ν11 = 35.3 |
| R21 = −143.41 | D21 = Variable | | |
| R22 = −282.08 | D22 = 9.04 | N12 = 1.60342 | ν12 = 38.0 |
| R23 = 1122.30 | D23 = 3.45 | N13 = 1.79952 | ν13 = 42.2 |
| R24 = 260.65 | D24 = 3.73 | | |
| R25 = 301.09 | D25 = 8.29 | N14 = 1.63980 | ν14 = 34.5 |
| R26 = −417.03 | | | |

| f | 100 | 195.6 | 238.6 |
|---|---|---|---|
| D10 | 149.2 | 24.94 | 1.47 |
| D21 | 3.63 | 15.49 | 20.73 |

-continued

| F = 100–238.6 FNo = 1:4 2ω = 73.5–34.7 |
|---|

$$\frac{|f_1|}{f_T} = 0.809 \quad \frac{l_{2T}}{l_{1W}} = 0.139$$

$$\frac{f_2}{|f_3|} = 0.148$$

What I claim:

1. A high varifocal range wide angle zoom objective having the following conditions:
    having three lens groups with, from front to rear, a divergent 1st lens group, a convergent 2nd lens group and a divergent 3rd lens group,
    zooming being performed by moving said three lens groups,
    said 2nd lens group moving in only one direction,
    letting $b_W$ and $b_T$ denote the distances from the 2nd lens group to an image plane when in the wide angle and telephoto positions respectively, f2, the focal length of the 2nd lens group, $c_W$ and $c_T$, the distances from said 3rd lens group to the image plane when in the wide angle and telephoto positions respectively, and f3, the focal length of the 3rd lens group, and putting $$t2 = b_T - b_W$$

$$t3 = c_T - c_W$$

and wherein the following relationships are satisfied:

$$0.2 < t3/t2 < 0.9$$

$$0.01 < f2/|f3| < 0.5.$$

2. A high varifocal range wide angle zoom objective according to claim 1, wherein said 3rd lens group has at least one positive lens on the image side.

3. A high varifocal range wide angle zoom objective having the following conditions:
    having three lens groups with, from front to rear, the divergent 1st lens group, the convergent 2nd lens group and the divergent 3rd lens group,
    zooming being performed by moving said three lens groups,
    said 2nd lens group moving in only one direction,
    the axial separation between said 2nd lens group and said 3rd lens group being wider in the telephoto position than in the wide angle position,
    letting f1, f2 and f3 denote the focal lengths of said 1st lens group, 2nd lens group and 3rd lens group respectively, fT the longest focal length of the entire system, $l_{12W}$ the axial separation between said 1st lens group and said 2nd lens group in the wide angle position, and $l_{23T}$ the axial separation between said 2nd lens group and said 3rd lens group in the telephoto position, $$0.4 < |f1|/fT < 0.95$$

$$0.01 < f2/|f3| < 0.5$$

$$0.05 < l_{23T}/l_{12W} < 0.9$$

being satisfied.

4. A high varifocal range wide angle zoom objective according to claim 3, wherein said 1st lens group has at least one positive lens on the image side, said 2nd lens group has an aperture stop, at least three positive lenses and at least one negative lens, and said 3rd lens group has at least one positive lens on the image side.

5. A high varifocal range wide angle zoom objective according to claim 3, wherein said 1st lens group has at least one positive lens on the object side, said 2nd lens group has an aperture stop, at least three positive lenses and at least one negative lens, and said 3rd lens group has at least one positive lens on the image side.

6. A high varifocal range wide angle zoom objective according to claim 3, wherein said 1st lens group has a positive lens on both the object side and the image side, said 2nd lens group has an aperture stop, at least three positive lenses and at least one negative lens, and said 3rd lens group has at least one positive lens on the image side.

* * * * *